United States Patent Office 2,768,983
Patented Oct. 30, 1956

2,768,983

HF–BF₃ CATALYTIC PROCESSING

Alistair S. Couper, Hammond, Ind., and Andrew Dravnieks, Park Forest, Ill., assignors to Standard Oil Company, Chicago, Ill., a corporation of Indiana Application January 31, 1955, Serial No. 485,062

7 Claims. (Cl. 260—668)

This application relates to the processing of organic materials using an HF–BF₃ agent. More particularly it relates to the treating of hydrocarbons with a liquid HF–BF₃ agent.

The system HF–BF₃ is a very powerful catalyst for many organic reactions. The system may be either a mixture of HF vapor and BF₃ gas or it may be a solution of BF₃ gas in HF liqiud, or it may be a complex of HF–BF₃ and organic substances dissolved in HF liquid containing additional dissolved BF₃. The HF–BF₃ system has such a variety of effects on so many organic substances, particularly hydrocarbons, that its use in many organic reactions on a commercial scale is desirable. Unfortunately, liquid HF–BF₃ particularly is extremely corrosive to ordinary materials of construction and it has been necessary to use the expensive alloy, such as Hastelloy, Stellite, and Multimet. The need for extremely expensive materials of construction has made the capital investment in many HF–BF₃ promoted operations economically prohibitive in competition with less effective catalysts or agents which, however, require, less expensive equipment.

An object of the invention is a process for treating or reacting organic substances utilizing HF–BF₃ agent or catalyst which has a reasonably inexpensive capital investment and maintenance cost. A particular object is the processing of liquid hydrocarbons utilizing liquid HF–BF₃ agent, which process requires relatively inexpensive capital investment and a minimum amount of maintenance caused by corrosion owing to the HF–BF₃ agent. Other objects will become apparent in the course of the description of the invention.

It has been found that organic substances, particularly hydrocarbons, can be treated or reacted utilizing HF–BF₃ agent or catalyst, particularly liquid HF–BF₃ in relatively inexpensive process equipment by having the surfaces exposed to the HF–BF₃ agent made of aluminum material. The aluminum material may be either high purity aluminum or technically pure aluminum which contains no intentional amounts of alloying elements or aluminum alloys containing the usual alloying elements such as chromium, copper, magnesium, manganese, silicon and tantalum. For operations above about 100° C., it is preferred to utilize aluminum alloys which are substantially free of silicon and/or copper. For operation above about 150° C., it is preferred to operate with either high purity aluminum or technically pure aluminum. The process equipment may be either made entirely of the aluminum material or preferably of steel which has been cladded with aluminum material.

Figure 1:
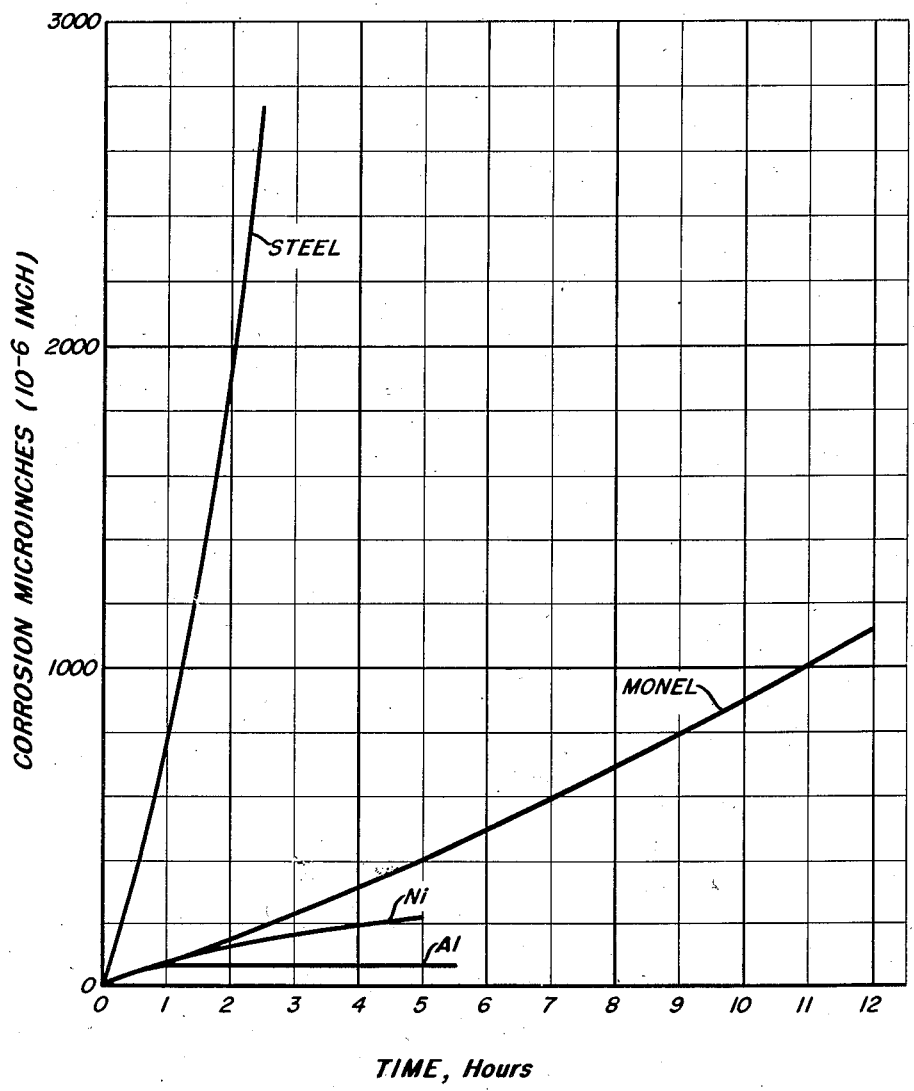
Figure 1 is a graphical representation of the amount of corrosion related to time of exposure of four common materials of construction.

The corrosive effect of HF–BF₃ agent on several aluminum materials and other metals known to be resistant to attack by liquid HF or HF–BF₃ agent are set out in the following tests. The composition of the aluminum alloys and of the other metals utilized in the tests are set out in Table I.

TABLE I

| Alloy No. | Alloying Elements in Aluminum Material | | | | | |
|---|---|---|---|---|---|---|
| | Cr | Cu | Mg | Mn | Si | Fe |
| 2S | Technically pure aluminum (no intentional alloying) | | | | | |
| 3S | | | | 1.2 | | |
| 4S | | | 1.0 | 1.2 | | |
| 52S | 0.25 | | 2.5 | | | |
| 54S | 0.25 | 0.1 | 3.5 | 0.1 | 0.45 | 0.45 |
| 61S | 0.25 | 0.25 | 1.0 | | 0.6 | |
| 63S | | | 0.7 | | 0.4 | |

Hastelloy C:
  Cr, 16.5; Fe, 6; Mo, 17; Ni, 56; Ti, 4.5; C, 0.15.
Monel:
  Cu, 30; Fe, 1.4; Mn, 1.0; Ni, 67; Si, 0.1; C, 0.15.
Multimet:
  Co, 20; Cr, 21; Fe, 22.5; Mo, 3; Ni, 20; Ti, 2.5; C, 0.12; N, 0.15.
Steel, 304
Stainless:
  Cr, 18; Fe, 70; Mn, 2; Ni, 9; Si, 1; C, 0.08.

Test Series 1

The corrosivity tests were carried out on a number of metals simultaneously utilizing an autoclave having a capacity of 1500 ml. Two autoclaves were used in the course of the work, one of low carbon steel and the other of Monel. No significant difference was noticed on the rate of corrosivity of the test specimens in the different autoclaves. The autoclaves were provided with stainless steel propeller stirrers which could be rotated at 1725 R. P. M. The stirred corrosivity tests were carried out on foil strips having a thickness range from 0.001–0.010 inch. These specimens were mounted in holders made of Teflon. Each holder could hold one specimen. Four holders could be placed simultaneously in the autoclave. The amount of corrosion occurring during the exposure was measured by the electrical resistance of the specimens measured before and after the test. This procedure is described in detail in an article entitled, "Industrial Applications of a Method for Measuring Small Amounts of Corrosion Without Removal of Corrosion Products" by Andrew Dravnieks and Horace A. Cataldi, published in Corrosion, vol. 10, No. 7, 224–230 (1954) July.

In Test Series 1 the autoclave was charged with 600 g. of commercial grade anhydrous liquid hydrofluoric acid; this contains about 1% of water. Commercial grade anhydrous boron trifluoride in an amount of 130 g. was charged to the autoclave. The autoclave containing the specimens and the liquid HF–BF₃ was heated to 83° C. (181° F.) and the contents were stirred for 3 hours at this temperature. The initial pressure in the autoclave was 500 p. s. i. g. Some increase in pressure resulted from evolution of hydrogen from the reaction of the steel walls with HF. At the completion of the run, specimens were removed from the autoclave and the amount of corrosion in the test was determined by the electrical resistance method. The determined corrosion was then extrapolated linearly to an inches per year rate. The linear extrapolation assumes that the rate of corrosion will be constant and disregards formation of protective films. Later results presented herein show that this assumption is not true with respect to aluminum materials and that the linear extrapolation rates are much too high for aluminum materials. The results of this test series are presented in Table II.

TABLE II

| Specimen | Linear Extrapolation Inches per Year |
|---|---|
| Aluminum 2S | 0.002 |
| Aluminum 52S | 0.002 |
| Hastelloy C | 0.046 |
| Monel | 1.3 |

Test Series 2

In this test series the corrosivity was determined during the actual conversion of aromatic hydrocarbons utilizing liquid HF–BF₃ agent as the catalyst. The process involves the interaction of ortho-xylene, meta-xylene, and para-xylene with ethylbenzene to produce essentially pure 3,5-dimethyl-1-ethylbenzene and high purity meta-xylene. Thus the reaction involves isomerization of ortho and para-xylene as well as transfer of the ethyl group to a xylene molecule to form the ethylxylene. Benzene is produced as a by-product of the reaction. Slight amounts of higher boiling materials may also be produced. The charge to the autoclave consisted of a natural mixture of xylene isomers and ethylbenzene plus a small amount of paraffin hydrocarbons boiling in the xylene boiling range. This charge was derived by extractive distillation of the naphtha product of the catalytic reforming in the presence of hydrogen of a petroleum naphtha. Hereinafter this feed is referred to as a "C₈ feed." 259 g. (2.45 moles) of the C₈ feed were charged to the autoclave. Commercial anhydrous hydrofluoric acid in an amount of 535 g. (26.8 moles) were then charged to the autoclave. 260 g. (3.82 moles) of BF₃ were then charged to the autoclave. The autoclave was then cooled or heated to the desired temperature of reaction and the contents agitated for a period of 3 hours.

Tests were carried out at the following temperatures:

| °C | °F |
|---|---|
| −21 | −6 |
| +20 | 68 |
| +38 | 100 |
| +80 | 176 |
| +120 | 248 |

Not all the materials were tested at every temperature. However, it is believed that the results are representative. The results of these tests over this temperature range of −21° C. to +120° C. are set out in Table III. In all cases the results were extrapolated to inches per year from results over 3 hours.

TABLE III

| Material | Linear Extrapolation—Inches per year | | | | |
|---|---|---|---|---|---|
| | −21°C. | 20°C. | 38°C. | 80°C. | 120°C. |
| Aluminum: | | | | | |
| 2S | 0.002 | 0.001 | 0.001 | 0.002 | 0.014 |
| 3S | | | | 0.002 | |
| 4S | | | | 0.002 | |
| 52S | | | | 0.002 | |
| 54S | | 0.001 | | 0.002 | |
| 61S | | 0.005 | | 0.008 | 0.05 |
| 63S | | 0.005 | | 0.025 | |
| Hastelloy C | 0.004 | 0.023 | | 0.046 | 0.035 |
| Monel | 0.25 | 0.083 | 0.3 | 1.3 | 5.2 |
| Multimet | | | | 0.003 | 0.001 |
| Steel (low carbon) | 1.7 | 6.6 | 6.8 | 10.0 | |
| Steel (304 Stainless) | | | | 1.5 | |

The results above show that steel is useless at all temperatures with HF–BF₃ agent. Further, they show that 304 stainless steel and Monel are of no value at temperatures above ordinary room temperature of about 20° C. Hastelloy C appears to be suitable for temperatures below about 100° C. For operations above 120° C. Multimet and certain aluminum alloys appear to be the only real feasible materials. The results with aluminum 61S indicate that at temperatures above about 100° C. the presence of copper and silicon is undesirable in the aluminum material. It is of considerable interest that on this basis of linear extrapolation with aluminum 2S, i. e., technically pure aluminum, it is as resistant to HF–BF₃ corrosion as is the more expensive Multimet and far better than the commonly considered extremely resistant Hastelloy C.

Test Series 3

In this test series the rate of corrosion was determined by measuring the electrical resistance of the foil specimens periodically while the corrosion test was taking place. This was done by attaching platinum leads to the foil specimens and withdrawing the leads through a Teflon seal and making the connection to the electrical resistance measuring device. These tests were carried out for various periods of time with measurement being made at intervals of 1 hour. The foil specimens utilized were aluminum 2S, pure nickel, Monel and low carbon steel. The test conditions were the same as those in Test Series 2 except that this series was carried out at 80° C. only. The results of these corrosion determinations are set out in Figure 1.

The curves of corrosion versus time for low carbon steel and Monel show that no protective film is formed. It appears that nickel forms a partially protective film, as the rate of corrosion slowed down gradually with the passage of time. The aluminum 2S curve is extremely striking in the constant amount of corrosion reached; this indicates that a protective film has formed which stops further corrosive attack. Thus extrapolation of the aluminum corrosion in the short test to inches per year is extremely conservative. On the basis of the aluminum 2S curve in Figure 1, the extrapolated corrosion in inches per year, assuming a factor of 5 to take into account possible film failures, would be only about 0.0003.

Test Series 4

In this series of tests, the effect of added water was determined. One percent by weight of water was added to the autoclave containing the amounts of HF–BF₃ and C₈ feed described in Test Series 2. Tests were carried out with aluminum 2S, Monel and nickel. Within the error of the determination at 80° C., the addition of this much water did not appreciably change the corrosion rate of these materials.

Test Series 5

In this series, the effect of velocity on the corrosion rate of certain materials was examined. The velocity tests were carried out in the autoclave and using the same HF–BF₃ and C₈ feed described in Test Series 2. The velocity tests were carried out at 80° C. The velocity tests were carried out by arranging specimens measuring 1/16 inch thick, 1/2 inch wide, and 2½ inches long on a shaft provided with a Teflon sleeve. The specimens were spaced one inch apart and the shaft was rotated at 1725 R. P. M. The corrosion was measured at various points on the specimens in order to determine corrosion rates at 6 feet per second, 10 feet per second, and 18 feet per second velocities, respectively. The data showed that aluminum 3S, Hastelloy C, Monel, and 304 stainless steel showed no appreciable velocity effect at these conditions. That is the corrosion rates determined by this method were, within the experimental error, the same as those rates determined by other methods. However, Multimet showed a pronounced velocity effect in that the corrosion rate of the test specimen was approximately 10 times as great as that of the static corrosion rate.

Test Series 6

A continuous flow pilot plant was used to study the xylene-ethylbenzene interaction in the presence of liquid HF–BF$_3$ agent. The relative amounts of HF–BF$_3$ and C$_8$ feed in the continuous pilot plant work was approximately the same as that set out in the autoclave work. These are approximately 11 moles of liquid HF and 1.8 moles of BF$_3$ per mole of aromatic hydrocarbon in the feed. The reactor pressure was about 600 p. s. i. g. and the total residence time of the hydrocarbons was about 2 hours at 80° C.

After 94 hours of total exposure to liquid HF–BF$_3$ agent at these conditions, the pilot plant was dismantled and the equipment examined for corrosion. The Monel reactor itself was severely corroded and at the bottom the corrosion rate was determined to be 1.4 inches per year. This rate on the pilot plant reactor checks very well with the extrapolated corrosion rates of Monel from the short term tests in the autoclave. Specimen strips were exposed for this entire time in the reactor and these strips were measured for corrosion. Aluminum 2S and Hastelloy C after 94 hours of exposure showed negligible corrosion, which results also support the results from the short term autoclave test.

The inlet line for introducing BF$_3$ to the pilot plant reactor had been of Monel. After 94 hours of exposure, the measured corrosion was 3.0 inches per year. The Monel line was replaced with an aluminum 2S line and after a subsequent exposure of about 100 hours the aluminum line showed negligible corrosion. Thus the aluminum materials are effective against BF$_3$ itself as well as against liquid HF–BF$_3$ material.

The results given above on the resistance of aluminum materials to exposure to HF–BF$_3$ agents are in marked contrast with the results set out by Holmberg and Prange, Industrial and Engineering Chemistry, 37 1030 (1945) wherein at 82–88° C. anhydrous HF attacked aluminum at a rate of 0.976 inch per year.

It has been found that the aluminum materials are susceptible to corrosive attack by dilute aqueous HF solutions. Therefore, precautions should be taken to purge vessels and lines exposed to HF–BF$_3$ agent of all the HF prior to allowing atmospheric air to enter the system. Sufficient moisture may enter to cause trace amounts of HF to produce some spot corrosion on the aluminum material surfaces which have not been completely purged of HF.

Figure 2:
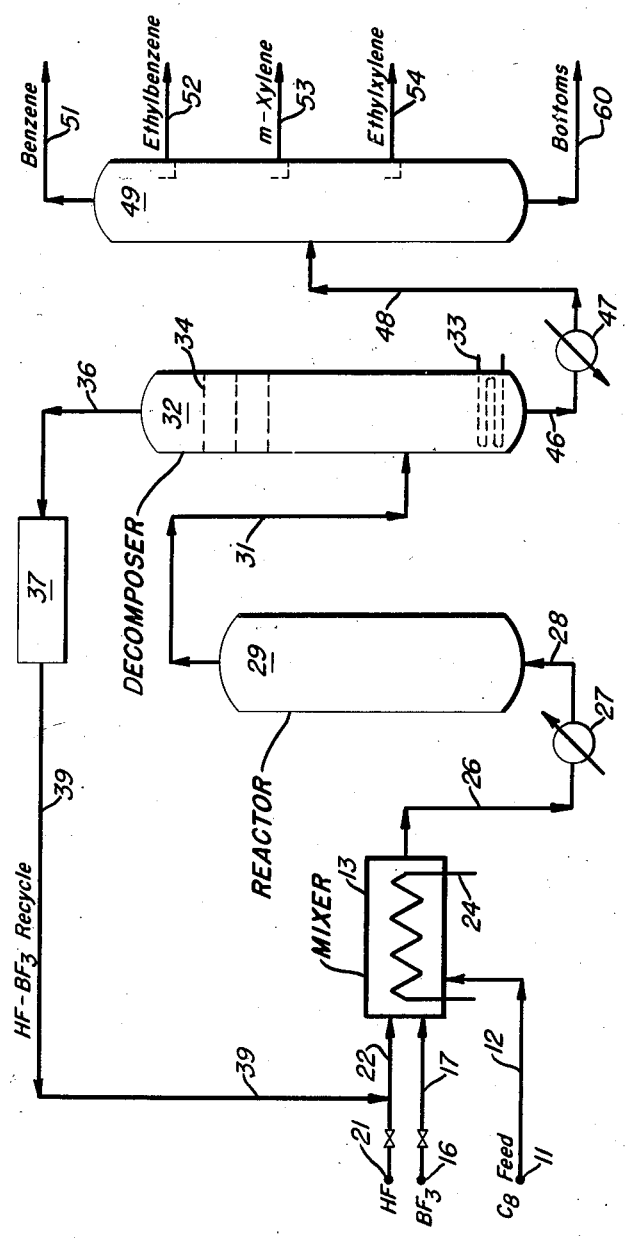
Figure 2 is a schematic representation of a typical process utilizing liquid HF–BF₃ agent for the reacting of liquid aromatic hydrocarbons.

Figure 2, which forms a part of this specification, shows an illustrative embodiment of an HF–BF$_3$-catalyzed process. In this figure, many items of process equipment have been omitted, particularly pumps, vacuum pumps, etc. In this embodiment, there is shown a large scale reaction of C$_8$ feed which consists of essentially only xylene isomers and ethylbenzene to form benzene, unreacted ethylbenzene, meta-xylene, 3,5-dimethyl-1-ethylbenzene and a small amount of higher boiling by-product. The C$_8$ feed from source 11 is passed by way of line 12 into mixer 13. Line 12 may be ordinary steel or stainless steel or it might be aluminum. BF$_3$ from source 16 is passed by way of valved line 17 into mixer 13. Line 17 is preferably made of aluminum clad steel; the aluminum surface being exposed to BF$_3$. Substantially anhydrous liquid HF from source 21 is passed by valved line 22 into mixer 13. Line 22 may be formed of an HF resistant material which is also resistant to HF and BF$_3$, for example, Hastelloy C.

Mixer 13 is a vessel adapted to thoroughly intermingle HF, BF$_3$, and the feed. Suitable orifice plates may be used. The HF, BF$_3$, and the aromatic hydrocarbons react to form a complex containing 1 mole of HF, 1 mole of BF$_3$, and 1 mole of polyalkylbenzene, per mole of complex. In the system, about 10 moles of HF and about 1.5 moles of BF$_3$ are introduced per mole of aromatic hydrocarbon charged; thus a very large excess of HF is present to dissolve the complex and an excess of BF$_3$ is present which is maintained dissolved in the acid phase by operating at superatmospheric pressures. The complex formation is exothermic and heat exchanger coil 24 is present in mixer 13 to assist in control of the temperature. All surfaces exposed to the HF–BF$_3$ agent in mixer 13 are made of aluminum or aluminum-cladded material. Heat exchanger 24 may be of aluminum metal provided with aluminum fins. From mixer 13 the acid phase is passed through line 26, heat exchanger 27 and line 28 into reactor 29.

Under the conditions of operation, the C$_8$ feed is entirely dissolved in the acid phase and sufficient pressure is maintained on the system to keep the HF in the liquid phase. Thus operations herein are liquid phase and the agent is spoken of as liquid HF–BF$_3$. Actually, there are present here liquid HF medium, BF$_3$ dissolved therein and a complex of HF–BF$_3$-aromatic hydrocarbon dissolved in the liquid HF. In heat exchanger 27 the temperature of the acid phase is adjusted to 90° C. the desired operating temperature. Lines 26 and 28, and heat exchanger 27 are made of aluminum clad steel with the surfaces exposed to the liquid HF–BF$_3$ agent being of aluminum material.

Reactor 29 is a vertical cylindrical vessel adapted to provide the necessary reaction time of about 2 hours. Reactor 29 operates in slug flow and is insulated to maintain the temperature of the contents at about 90° C. The interior of reactor 29 is clad with technically pure aluminum to minimize corrosion at these temperatures. From reactor 29 the acid phase is passed by way of line 31 into decomposer 32. Line 31 is aluminum clad steel. Decomposer 32 is in effect a fractionating tower provided with a reboiler 33 and some fractionation trays 34. All the interior surfaces of decomposer 32 exposed to the HF–BF$_3$ agent are made of aluminum material either solid or clad. Decomposer 32 is operated under vacuum to avoid side reactions in the removal of HF and BF$_3$.

HF and BF$_3$ vapors are withdrawn overhead by way of line 36 and introduced into a recovery zone 37. In recovery zone 37, BF$_3$ may be separated from gaseous by-products and the liquid HF and BF$_3$ then recycled to mixer 13 by way of line 39. Materials exposed to HF containing dissolved BF$_3$ and BF$_3$ itself in zone 37 are made of either aluminum or aluminum clad steel. Since zone 37 and line 39 are operated at lower temperatures than the reaction zone, these may be made of cheaper aluminum alloys.

It is to be understood that the xylene-ethylbenzene interaction and xylene isomerization reaction began as soon as the HF–BF$_3$ and C$_8$ feed are intermingled in mixer 13. The reaction continues through the lines and exchangers connecting mixer 13 and reactor 29; also it continues through line 31 into decomposer 32. Side reactions may occur in decomposer 32. Thus the term "reaction vessels" in this embodiment includes mixer 13, reactor 29, decomposer 32 and the lines and vessels joining these designated vessels.

Liquid hydrocarbons are removed as a bottoms product from decomposer 32 by way of line 46. These hydrocarbons are heated in heat exchanger 47 and are passed by way of line 48 into a fractionation system 49 which is shown schematically. Product benzene, ethylbenzene, meta-xylene, ethylxylene, and by-product bottoms are shown as being withdrawn from fractionation zone 49 by lines 51, 52, 53, 54, and 60 respectively.

In the pumping equipment, which is necessary for the process of Figure 2, it is considered that Hastelloy C is the preferred material for forming at least the impellers. Aluminum clad bodies might be used.

The process shown in Figure 2 is only one of the numerous which utilize HF–BF$_3$ agent. Thus liquid HF–BF$_3$ is used as the catalyst for the reaction of toluene and carbon monoxide, to produce tolyl aldehyde. HF-BF₃ is utilized in the alkylation of olefins and isoparaffins, such as butylene and isobutane. Also, it is used in the isomerization of paraffins to branched-chain hydrocarbons. Further, it is used to catalyze the alkylation of aromatic hydrocarbons and olefins, such as xylene with ethylene. In addition to the xylene isomerization and xylene-ethylbenzene interaction process previously described, liquid HF-BF₃ may be used in the disproportionation of ethylbenzene to diethylbenzene or xylene to mesitylene. In addition to these processes wherein HF-BF₃ is used as primarily a catalyst, there are processes wherein the HF-BF₃ might be described as a treating agent. Thus liquid HF-BF₃ may be used to remove aromatic hydrocarbons and sulfur compounds from petroleum distillates containing paraffins, naphthenes, aromatic hydrocarbons and sulfur compounds. Another use of liquid HF-BF₃ agent is in the separation of metaxylene from the ortho and para-xylene isomers. This process is carried out by controlling the amount of BF₃ present with respect to the metaxylene content of the feed. Numerous other processes are known which utilize HF-BF₃ agent and preferably liquid HF-BF₃ agent and it is intended that the process of this invention is applicable to all these various processes.

Thus having described the invention, what is claimed is:

1. In the process of reacting hydrocarbons in the presence of a catalytic agent consisting of substantially anhydrous HF and BF₃, the improvement wherein the surfaces exposed to HF-BF₃ agent are aluminum material.

2. A process which comprises treating a liquid hydrocarbon with a liquid HF-BF₃ agent wherein the surfaces exposed to HF-BF₃ agent are aluminum material.

3. The process of claim 2 wherein the temperature is not more than about 150° C.

4. The process of claim 2 wherein said material is aluminum substantially free of alloying elements.

5. The process of claim 2 wherein said material is aluminum alloy substantially free of silicon.

6. The process of claim 2 wherein said material is aluminum alloy substantially free of copper.

7. A process comprising treating a liquid hydrocarbon under substantially anhydrous conditions with a liquid HF-BF₃ agent in an amount sufficient to form a distinct separate acid phase, at a temperature of not more than about 150° C., wherein the reaction vessel surface exposed to said agent is aluminum material.

References Cited in the file of this patent

The Condensed Chemical Dictionary, edited by Staff of Chemical Engineering Catalog, 3rd edition, 1942, Reinhold Publishing Company, New York.